Patented Jan. 16, 1951

2,538,081

UNITED STATES PATENT OFFICE 2,538,081

PENICILLIN-DIISOPROPYLETHER COMPLEX AND PREPARATION THEREOF

Rudolf P. Buhs, Rahway, and Nelson R. Trenner, Westfield, N. J., assignors to Merck & Co., Inc., Rahway, N. J., a corporation of New Jersey No Drawing. Application January 2, 1948, Serial No. 378

10 Claims. (Cl. 260—302)

This invention is concerned generally with the preparation of benzylpenicillinic acid in crystalline form by new and improved chemical procedures. More particularly, it relates to the preparation of crystalline benzylpenicillinic acid-diisopropyl etherate.

In accordance with our invention, it is now found that benzylpenicillinic acid (Penicillin G) can be obtained in crystalline form from pure, i. e., peroxide free, diisopropyl ether solutions as the diisopropyl etherate. The precipitation of this crystalline complex is sufficiently quantitative to serve as a method of isolating benzylpenicillin. Since only benzylpenicillinic acid and none of the other penicillins appear to form a crystalline diisopropyl etherate, it is possible to separate benzylpenicillinic acid from mixtures of penicillins and accompanying impurities.

It has been established with reasonable certainty that benzylpenicillinic acid has the structural formula

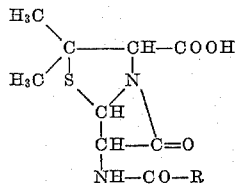

wherein R represents the benzyl group

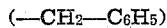
(—CH₂—C₆H₅)

Other antibiotics of the penicillin class are of similar structure differing only in that the benzyl group is replaced by other monovalent organic radicals, generally radicals having five or more carbon atoms. Penicillins, such as penicillin F, wherein R is Δ²-pentenyl

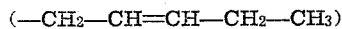
(—CH₂—CH=CH—CH₂—CH₃)

dihydropenicillin F, wherein R is n-amyl; penicillin X, wherein R is p-hydroxy benzyl and penicillin K, wherein R is n-heptyl have been identified.

Penicillin is sold commercially in the form of a salt containing a mixture of various penicillins. Although both saturated and unsaturated hydrocarbon radicals at R in the above formula give products having penicillin activity, it has been found that the benzylpenicillin type is more efficacious in therapy then some of the other forms. It is therefore desirable that benzylpenicillin be separated from the less desirable types.

The isolation of a benzylpenicillin compound from a mixture containing benzylpenicillin and other penicillins has previously been accomplished by the formation of the triethylamine salt of benzylpenicillin. This procedure, however, results in an unsatisfactory (impure) product and is therefore not economical for manufacture.

It is one object of this invention to provide a practical process for the isolation and purification of a benzylpenicillinic acid complex from a mixture of penicillins, which can be readily carried out and does not result in significant losses of penicillin.

It is a further object of this invention to provide a solid (crystalline) form of a benzylpenicillinic acid which is stable and which can be recovered directly from a concentrated broth containing benzylpenicillin and other penicillins.

It is a still further object of this invention to provide an oil-soluble form of benzylpenicillin which can be dissolved in a vehicle and used readily in parenteral or local administration.

It has now been found that diisopropyl ether solutions containing benzylpenicillinic acid precipitate crystalline benzylpenicillinic acid-diisopropyl etherate. Solutions of benzylpenicillinic acid in diisopropyl ether are conveniently obtained by extracting aqueous solutions containing this acid with diisopropyl ether. For example, a concentrated culture broth containing benzylpenicillinic acid can be extracted directly with diisopropyl ether and benzylpenicillinic acid-diisopropyl etherate precipitated. Alternatively a solution of benzylpenicillinic acid in a solvent miscible with diisopropyl ether can be employed to obtain the diisopropyl etherate. For example, when a solution of benzylpenicillinic acid in diethyl ether or chloroform is added to a diisopropyl ether, said mixture deposits crystals of the diisopropyl etherate on standing.

Impure amorphous or pure crystalline alkali metal salts of benzylpenicillinic acid, or a mixture of salts of various penicillins are suitable for use in the present process. The mixed salts containing benzylpenicillin may be dissolved in water or in an aqueous buffer solution (such as citrate). It has been found that although a buffering substance may be employed, it is not essential. The aqueous solution of sodium benzylpenicillinate is acidified with any strong inorganic acid such as hydrochloric, sulfuric, or phosphoric acid. We have obtained the best results using hydrochloric acid. Sufficient acid is added to adjust the pH of the solution to between 2 and 6. It has been found that the best yields are obtained when the solution is at approximately pH 2. The addition of the acid converts the salt to benzylpenicillinic acid which is then extracted with diisopropyl ether. The layers are separated and the diisopropyl ether layer is filtered or treated with anhydrous sodium sulfate to remove suspended water. The benzylpenicillinic acid-diisopropyl ether complex crystallizes from the ether solution on standing at room temperature. It is not necessary to cool the solution to achieve crystallization.

Any benzylpenicillinic acid remaining in the aqueous layer is recovered by saturating the aqueous layer with sodium chloride or other nonextractable salts in order to decrease the solubility of the benzylpenicillinic acid. The solution is again extracted with diisopropyl ether and the layers separated. After filtration, the ether layer is allowed to stand and benzylpenicillinic acid-diisopropyl etherate crystals separate from solution.

Alternatively, an aqueous solution of benzylpenicillinic acid may be saturated with sodium chloride or other non-extractable salts prior to extraction with diisopropyl ether. The sodium chloride or other nonextractable salts decreases the solubility of benzylpenicillinic acid and thus increases the solution of benzylpenicillinic acid in the nonaqueous layer. The layers are separated and the benzylpenicillinic acid-diisopropyl etherate separates from the diisopropyl ether solution.

The benzylpenicillin acid-diisopropyl etherate can be readily converted to the alkali or alkali earth metal salts of benzylpenicillin by addition of one equivalent of the appropriate alkali or alkali earth metal hydroxide.

The following examples illustrate a method of carrying out the present invention, but it is to be understood that these examples are given by way of illustration and not of limitation.

Example 1

2.0 grams of crystalline sodium benzylpenicillinate was dissolved in 40 ml. of pH 5.0, 1 molar citrate buffer. The pH of the solution was adjusted to between 2.5 and 3.0 by the addition of 160 ml. of 0.375 N hydrochloric acid. The solution containing benzylpenicillinic acid was then extracted with 200 ml. of diisopropyl ether. The layers were separated, and the diisopropyl ether extract was filtered to remove suspended water. The ether layer was then allowed to stand in a refrigerator for a few hours. Crystals of benzylpenicillinic acid-diisopropyl etherate separated from solution and 0.62 gram of this desired product was recovered.

The acidified aqueous layer was saturated with sodium chloride and the extraction repeated using a 100 ml. portion of diisopropyl ether. The layers were separated and the ether solution filtered. After allowing the ether solution to stand in the refrigerator for approximately 17 hours, this second extract yielded an additional 0.32 gram of benzylpenicillinic acid-diisopropyl etherate.

The product was shown to be pure benzylpenicillinic acid by the N-ethyl piperidine assay.

The benzylpenicillinic acid-diisopropyl etherate thus obtained had the following characteristic properties:

*Empirical formula by analysis.—*

$$C_{16}H_{18}N_2O_4S \cdot C_6H_{14}O$$

*Optical rotation.—*

$$[\alpha]_D^{23} = +241 \ (C=1.0; \ pH \ 7.47 \ buffer)$$

*Microbiological assay.—*1420 units/mg. *staph. aureus*.

*Ultra-violet absorption spectrum.—*In pH 7 buffer, closely resembles that of sodium benzylpenicillinate over the wavelength range 2200–3200 Å.

$$E_{1\%}^{1\,cm.} = 6.06 \ (2580 \ \text{Å})$$

On standing overnight at room temperature in water solution, the U. V. spectrum changes to one typical of benzylpenillic acid with a band maximum at 2350 Å.

*Infra-red absorption spectrum.—*In tetrachlorethane solution it shows the four, intense, characteristic bands shown by all the penicillins, i. e., the 5.60, 5.75, 5.93 and 6.65$\mu$ bands. In addition, a new strong band at 9.0$\mu$ was observed. This latter band is characteristic of all aliphatic ethers and constitutes additional proof of the presence of diisopropyl ether in the crystalline solid.

*Melting point.—*Substance begins to liquify at about 80° C. and at about 87° C. the partial melt gases violently leaving a porous glass on cooling. This is believed to be due essentially to decomposition of the penicillin and loss of the diisopropyl ether of solvation.

*Solubility properties.—*The crystalline free acid has a rather low solubility in water, is very soluble in methanol, other alcohols, and chlorinated solvents such as chloroform, and tetrachlorethane. It also shows moderate solubility in ethers and carbon tetrachloride. It readily recrystallizes from diisopropyl ether, but not from diethyl ether. It is also soluble in organic esters such as amyl acetate, etc.

*Stability properties.—*As indicated above, the crystalline free acid in contact with water slowly (overnight at room temperature) dissolves and rearranges to benzylpenillic acid. In tetrachlorethan solution at room temperature, it also slowly undergoes chemical changes. Evidence for this was derived from the infrared absorption measurements which showed that the 5.60$\mu$ lactam band completely disappears after standing overnight. Some benzylpenicillenic acid is formed together with other unidentified products during this treatment. The crystalline solid itself is nonhygroscopic and seems quite stable at room temperature since no changes in properties have been observed over a period of prolonged standing. No weight is lost in vacuo at 27° C.

Example 2

To a solution of 70 mg. of sodium benzylpenicillinate and 30 mg. of ammonium N-heptylpenicillinate in 2.0 ml. of water was added 3.0 ml. of 0.1 N hydrochloric acid. The resulting acid solution having a pH ranging between 2.0 and 2.5 was saturated with sodium chloride and extracted with two 5.0 ml. portions of diisopropyl ether. The diisopropyl ether extracts were separated from the acid water layer and combined. After seeding and standing overnight in the refrigerator at 5° C., 50 mg. of crystalline benzylpenicillinic acid-diisopropyl etherate was obtained.

The product was shown to be 90% pure benzylpenicillinic acid by the N-ethyl piperidine assay.

Example 3

250 mg. of sodium benzylpenicillinate was dissolved in 5.0 ml. of pH 5.0, 1 molar citrate buffer. One milliliter of this solution was acidified to pH 2-2.5 with 4.0 ml. of 0.375 N hydrochloric acid. The solution was then extracted with 5.0 ml. of diisopropyl ether. The diisopropyl ether extract was separated from the acidified aqueous layer. After standing at room temperature for about 20 minutes, it was observed that crystals separated from the diisopropyl ether. These crystals were shown to be benzylpenicillinic acid diisopropyl etherate.

Example 4

One gram of crude amorphous sodium penicillin, having an activity of 540 u./mg. was dissolved in 100 ml. of water. In order to destroy all of the original penicillins, preparatory to the addition of a known amount of pure sodium benzylpenicillinate, this solution was made alkaline (pH about 12) with 5.0 ml. of 1 N lithium hydroxide, and allowed to stand for 2 hours at room temperature. The solution was then readjusted by pH 7 with about 5 ml. of 1 N hydrochloric acid.

One gram of pure sodium benzylpenicillinate was added to the above neutral solution. The resulting solution had an activity of about 150,000 units/ml. and corresponded to a 1.7% solution of 830 u./mg. crude sodium benzylpenicillinate.

About 9 ml. of 1 N hydrochloric acid was used to acidify the solution to pH 2.5, after which it was extracted with 2×100 ml. portions of diisopropyl ether. The water layer was then saturated with sodium chloride and extracted with one 100 ml. and one 50 ml. portion of diisopropyl ether. All the diisopropyl ether extracts were combined, filtered and stored in the refrigerator. After standing for 17 hours at 5° C., 0.715 gram of benzylpenicillinic acid-diisopropyl etherate was obtained.

Example 5

2.0 grams of crude N-ethyl piperidinium benzylpenicillinate, containing about 18% of N-ethyl piperidinium $\Delta^2$-pentenylpenicillinate, was dissolved in 200 ml. of water. This solution was acidified to pH 2.5 with 4.5 ml. of 1 N hydrochloric acid, and extracted with 200 ml. of diisopropyl ether. The water layer was then saturated with sodium chloride, and extracted again with one 200 ml. and one 100 ml. portion of diisopropyl ether. The extracts were combined, filtered, and stored in the refrigerator at 5° C. for 20 hours. The benzylpenicillinic acid-diisopropyl etherate which crystallized out of this solution was 98% pure (by N-ethyl piperidine assay) and weighed 0.99 gram.

Example 6

100 mg. of sodium benzylpenicillinate was dissolved in 2.0 ml. of water, and 3.0 ml. of 0.1 N hydrochloric acid were added to acidify the solution to about pH 2.5. The benzylpenicillinic acid was extracted with two 5 ml. portions of diethyl ether. The extracts were combined, dried over anhydrous sodium sulfate and concentrated to 2.0 ml. with a stream of dry air at 25° C. Four volumes (8 ml.) of diisopropyl ether were added. The solution was mixed, and then stored in the refrigerator at 5° C. for 18 hours. Benzylpenicillinic acid-diisopropyl etherate crystallized out of solution.

The foregoing examples indicate that the new compound benzylpenicillinic acid - diisopropyl etherate can be readily produced and separated under various conditions. We have not found it possible to obtain crystalline free acids using diisopropyl ether with the other well-known penicillin types such as $\Delta^2$-pentenylpenicillin, p-hydroxypenicillin and n-heptylpenicillin. This observation makes for a highly practical process for recovering crystalline benzylpenicillinic acid from fermentation broths or other mixtures known to contain benzylpenicillin, its homologues and degradation products.

The above description and examples are intended to be illustrative only, any modification of, or variation therefrom, which conforms to the spirit of the invention, is intended to be included within the scope of the claims.

We claim:

1. Crystalline benzylpenicillinic acid-diisopropyl etherate complex.

2. The process that comprises reacting pure diisopropyl ether with benzylpenicillinic acid and crystallizing benzylpenicillinic acid-diisopropyl etherate.

3. The process that comprises adding pure diisopropyl ether to an aqueous solution containing benzylpenicillinic acid, separating the ether and aqueous layers and crystallizing benzylpenicillinic acid-diisopropyl etherate from said ether layer.

4. The process that comprises acidifying an aqueous solution of an alkali metal salt of benzylpenicillinic acid with a strong mineral acid, adding pure diisopropyl ether to the benzylpenicillinic acid solution thus obtained, separating the ether and aqueous layers, and crystallizing benzylpenicillinic acid-diisopropyl etherate from said ether layer.

5. The process that comprises acidifying an aqueous solution of sodium benzylpenicillinate with a strong acid, adding pure diisopropyl ether to the benzylpenicillinic acid solution thus obtained, separating the aqueous and ether layers, and crystallizing benzylpenicillinic acid-diisopropyl etherate from the ether layer.

6. The process that comprises acidifying an aqueous solution containing sodium benzylpenicillinate and ammonium N-heptylpenicillinate with hydrochloric acid to form benzylpenicillinic acid in solution, saturating the solution with sodium chloride and adding pure diisopropyl ether to the solution thus obtained, separating the ether and aqueous layers and crystallizing benzylpenicillinic acid-diisopropyl etherate from said ether layer.

7. The process that comprises acidifying an aqueous solution containing N-ethyl piperidinium benzylpenicillinate and N-ethyl piperidinium $\Delta^2$-pentenylpenicillinate with an inorganic acid to form benzylpenicillinic acid in solution, saturating the solution with sodium chloride and adding pure diisopropyl ether to the solution thus obtained, separating the ether and aqueous layers and crystallizing benzylpenicillinic acid-diisopropyl etherate from said ether layer.

8. The process that comprises acidifying an alkali metal salt of benzylpenicillinic acid with a strong mineral acid, extracting the benzylpenicillinic acid thus obtained into diethyl ether, adding pure diisopropyl ether to the said diethyl ether solution and crystallizing benzylpenicillinic acid-diisopropyl etherate from the solution.

9. The process for treating a solution of penicillins including benzylpenicillin to selectively isolate benzylpenicillin therefrom which comprises adjusting the acidity of said solution to provide a solution wherein the benzylpenicillin is present as free benzylpenicillinic acid, adding pure diisopropyl ether to said acid solution thereby forming separate aqueous and ether layers and crystallizing benzylpenicillinic acid-diisopropyl etherate from the ether layer.

10. The process for treating a solution of penicillins including benzylpenicillin to selectively isolate benzylpenicillin therefrom which comprises adjusting the acidity of said solution to provide a solution wherein the benzylpenicillin is present as free benzylpenicillinic acid, adding pure diisopropyl ether to said acid solution thereby forming separate aqueous and ether layers, crystallizing benzylpenicillinic acid-diisopropyl etherate from the ether layer and reacting the same with alkali to form the corresponding alkali metal salt of benzylpenicillinic acid.

RUDOLF P. BUHS.
NELSON R. TRENNER.

REFERENCES CITED

The following references are of record in the file of this patent:

Whitmore et al.: "Ind. and Eng. Chem.," Sept 1946, page 946.